C. F. FLYNN AND A. ARAGONA.
MANUALLY PROPELLED VEHICLE.
APPLICATION FILED APR. 10, 1920.
1,359,348.
Patented Nov. 16, 1920.
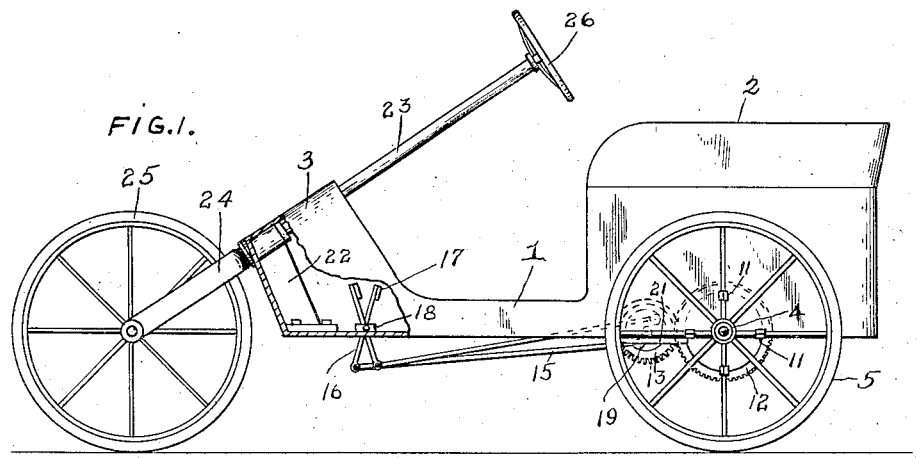
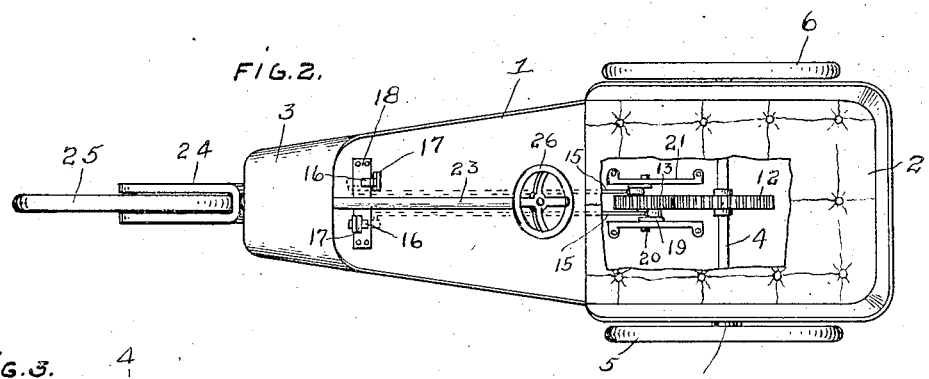
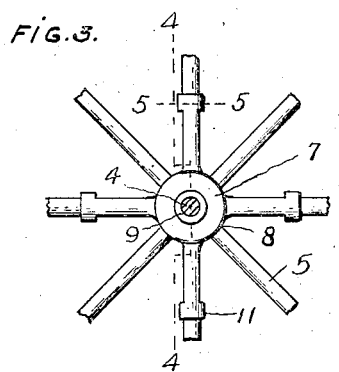
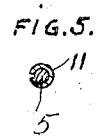
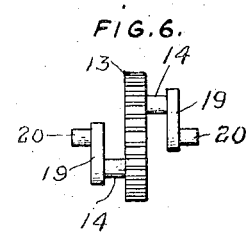
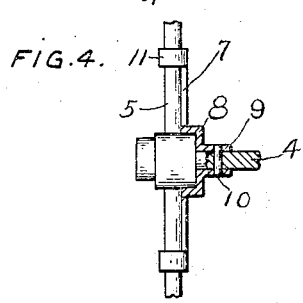
INVENTORS.
CHARLES F. FLYNN
ANDREW ARAGONA
BY
*Carey S. Frye*
ATTORNEY

UNITED STATES PATENT OFFICE.

CHARLES FREDRICK FLYNN AND ANDREW ARAGONA, OF KOKOMO, INDIANA.

MANUALLY-PROPELLED VEHICLE.

1,359,348.  Specification of Letters Patent.  Patented Nov. 16, 1920.

Application filed April 10, 1920. Serial No. 372,967.

*To all whom it may concern:*

Be it known that we, CHARLES F. FLYNN and ANDREW ARAGONA, citizens of the United States, residing at Kokomo, in the county of Howard and State of Indiana, have invented new and useful Improvements in Manually-Propelled Vehicles, of which the following is a specification.

This invention relates to vehicles of that class adapted to be manually propelled and is designed primarily for the convenience of children and the prime feature of the invention is the provision of driving gears having pedal operated means for operating the gears.

A further feature of the invention is the provision of means for connecting the driving axle of the vehicle to one of the axle supporting wheels for giving a positive drive to said wheel while the opposite wheel on the driving axle is left free to rotate independently of the axle thus giving a differential action.

A further feature of the invention is the provision of means for steering the vehicle.

Other objects and advantages will be hereinafter more fully set forth in the accompanying specification.

In the accompanying drawings which are made a part of this application,

Figure 1 is a side elevation of a vehicle with parts thereof broken away.

Fig. 2 is a top plan view of the vehicle with parts broken out.

Fig. 3 is a fragmentary elevation of one of the vehicle wheels showing the manner of connecting the same with the driving axle.

Fig. 4 is a sectional view as seen on line 4—4, Fig. 3.

Fig. 5 is a sectional view as seen on line 5—5, Fig. 3.

Fig. 6 is an edge elevation of one of the driving gears for propelling the vehicle.

Referring to the accompanying drawings in which similar reference numerals designate corresponding parts throughout the several views, 1 indicates the body of the vehicle, one end of which is provided with a seat 2 and the opposite end with a hood 3, these parts being formed in any desired shape and of any preferred material.

Rotatably mounted below the seat portion of the body 1 is a driving axle 4, upon the opposite ends of which are mounted wheels 5 and 6, the wheel 5 being positively driven through the medium of a spider 7, while the wheel 6 is a rotatable on the axle 4, thereby giving a differential drive to the wheels.

The hub 8 of the spider is provided with a sleeve 9 which is fixed to the axle 4 by extending a pin 10 transversely through the sleeve and axle and the arms of the spider are each provided with a pair of wings which are bent around the spokes of the wheel 5 and form collars 11, these collars serving to lock the spider in fixed relation with the wheel 5.

The hub 8 of the spider is hollow and surrounds the end of the wheel hub so that the arms of the spider rest against the spokes of the wheel and any suitable means may be substituted for the collars 11 for securing the spider to the wheel.

Fixed to the axle 4 is a main driving gear 12 with which meshes a secondary driving gear 13 the opposite faces of the latter gear having crank pins 14 extending outwardly therefrom with which are connected thrust rods 15, the opposite ends of said rods being connected with levers 16, each lever having a tread plate 17 thereon for receiving pressure from the feet of the occupant of the vehicle and by means of which the vehicle is propelled. The lower ends of the levers 16 are below the floor of the body 1 while the upper ends project a distance above the floor of the body, the levers being pivoted in a block 18 resting upon the floor of the body.

Attached to the outer ends of the crank pins 14, which are positioned on opposite sides of the axial center of the gear 13, are crank arms 19 which are extended substantially parallel with the faces of the gear 13 and inwardly to the axial center of the gear, said arms having outwardly extending bearing pins 20 thereon which find bearings in bearing plates 21 suspended from the body 1, said pins 20 forming the bearing shaft for the gear 13. This provides a double crank for the gear 13 and as said crank pins 14 are in staggered relation with each other, power may be applied first to one lever and its thrust rod and then to the other lever and thrust rod, thereby imparting a constant drive to the vehicle.

Mounted in the forward end of the body 1 is a standard 22, through the upper end of which is rotatably mounted a steering column 23, the lower end of the column having a fork 24 attached thereto in which is mounted a guide wheel 25, while to the opposite end of the column is attached a steering wheel 26 and by rotating the steering wheel the wheel 25 may be shifted from one direction to another for guiding the vehicle.

By constructing the vehicle in this manner it can be propelled with a small amount of energy as one of the foot levers is always in position to receive pressure from the foot, consequently no momentum is lost in operation, thus adapting the vehicle for use by the smaller as well as the larger child.

The invention claimed is:

1. A vehicle of the class described including a body portion, an axle rotatably attached to the body portion, a supporting wheel on each end of the axle, means for causing one of the wheels to rotate with the axle, a driving gear on said axle, a second gear meshing with said driving gear, crank members on opposite sides of said last gear and on opposite sides of the axis of said gear, said crank members having their outer ends integral with said last gear and their inner ends terminating in line with the axis of said gear, plates depending from said body portion forming the bearings for the inner ends of said cranks, thrust rods attached to said crank members, pivotally mounted foot operated levers for operating said thrust rods, a guide wheel at the forward end of the body, and means for controlling the swinging movement of said guide wheel.

2. A vehicle of the class described including a body portion, a rotatable axle carried thereby, supporting wheels at the ends of said axle, means for causing one of the wheels to rotate with the axle, a driving gear attached to said axle, a second gear meshing with the driving gear, a crank member at each side of said second gear, each crank member comprising a crank pin connected at one end to the second gear, a crank arm connected to the outer end of the crank pin and parallel with the face of the gear, a bearing pin at the inner end of said crank arm and axially of the second gear, bearing plates for said bearing pins, thrust rods pivoted to said crank pins, foot operated levers having their lower ends pivoted to said thrust rods, and their upper ends extended through the bottom of said body portion, a block on the body portion to which said levers are pivoted, a guide wheel, and means for controlling the guide wheel.

3. In a vehicle of the class described, an axle, means for driving said axle, a spider having a hub portion and arms, wings on said arms adapted to be formed into collars, means for securing said spider to said axle, and a wheel mounted on said axle parts of which are engaged by said collars for causing the wheel to rotate with said axle.

In testimony whereof we hereto affix our signatures.

CHARLES FREDRICK FLYNN.
ANDREW ARAGONA.